United States Patent
Cherukuri et al.

(10) Patent No.: US 7,209,907 B2
(45) Date of Patent: Apr. 24, 2007

(54) METHOD AND APPARATUS FOR PERIODICALLY RETRAINING A SERIAL LINKS INTERFACE

(75) Inventors: Naveen Cherukuri, San Jose, CA (US); Sanjay Dabral, Palo Alto, CA (US); David S. Dunning, Portland, OR (US); Tim Frodsham, Portland, OR (US); Theodore Z. Schoenborn, Portland, OR (US); Santanu Chaudhuri, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 475 days.

(21) Appl. No.: 10/877,355

(22) Filed: Jun. 25, 2004

(65) Prior Publication Data

US 2005/0286567 A1 Dec. 29, 2005

(51) Int. Cl.
*G06N 5/00* (2006.01)
(52) U.S. Cl. .............................. 706/16; 706/45; 706/47
(58) Field of Classification Search ................ 706/16, 706/45, 47; 370/507; 710/100; 709/238; 712/11
See application file for complete search history.

(56) References Cited

U.S. PATENT DOCUMENTS

| | | | |
|---|---|---|---|
| 5,701,416 A | * | 12/1997 | Thorson et al. ................ 712/11 |
| 2005/0027880 A1 | * | 2/2005 | Emmot ....................... 709/238 |
| 2005/0286567 A1 | * | 12/2005 | Cherukuri et al. .......... 370/507 |
| 2006/0041696 A1 | * | 2/2006 | Cherukuri et al. .......... 710/100 |

* cited by examiner

*Primary Examiner*—Wilbert L. Starks, Jr.
(74) *Attorney, Agent, or Firm*—Blakely, Sokoloff, Taylor & Zafman LLP

(57) ABSTRACT

A method and apparatus for retraining skew compensation in an interface is presented. In one embodiment, a retraining interval is determined, and counters in the transmitting agent and receiving agent count up until the retraining interval is reached. A tracking unit used to select one of several interpolated clocks may then be powered up, and a special retraining phit may be sent across the interface. During the retraining process, the transfer of flits into and out of the flow-control mechanism may be inhibited. When the retraining process is finished, the tracking unit may be powered down.

27 Claims, 8 Drawing Sheets

METHOD AND APPARATUS FOR PERIODICALLY RETRAINING A SERIAL LINKS INTERFACE

FIELD

The present disclosure relates generally to data interfaces between agents, and more specifically to point-to-point data interfaces requiring periodic retraining of skew compensation circuits.

BACKGROUND

Microprocessor systems have until recently been interconnected via multi-drop data buses. The processors, memory controllers, input-output controllers (which may generally be termed "agents") would be able to exchange data over a common data bus structure. However, as data transmission rates become higher, limitations in the multi-drop data buses are becoming a problem. The electrical loadings and reflections in a multi-drop data bus system may limit the data transmission speed. In order to address these and other issues, newer systems are examining individual, dedicated point-to-point data interfaces between the agents of a system.

There will still exist variances among agents attempting to exchange data via the point-to-point interfaces. Source impedances, path impedances, and termination impedances may all vary due to process variations and other influences. Data skew among the various parallel data lines, and between the clock and data lines, may become more of a problem at higher data rates. For this reason, during an initialization process the two agents at the opposite ends of the point-to-point interface may exchange special data messages to support the initialization process. After the initialization process, it may still be possible for there to be changes in the data skew, requiring periodic retraining of the skew compensation circuits. Such retraining may interfere with the flow-control mechanism, which in one embodiment may include a link-layer protocol, which ensures error-free data transmission.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

The following description describes techniques for periodic retraining of skew compensation circuits in a data interface. In the following description, numerous specific details such as logic implementations, software module allocation, signaling techniques, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. In certain embodiments the invention is disclosed in the form of an interface for connecting together several Itanium® Processor Family (IPF) compatible processors, or for connecting together several Pentium® compatible processors, such as those produced by Intel® Corporation. However, the invention may be practiced for interconnecting other kinds of processors, such as an X-Scale® family compatible processor (but not limited to any family of processor), or for interconnecting other forms of agents, such as memory hubs or input/output device hubs or chipsets. The invention may also be practiced in the interfacing of mixed kinds of processors or other agents. Finally, the invention may be practiced in dedicated point-to-point interfaces, where either the sending and receiving of data occur on a pair of one-directional links, or where the sanding and receiving of data occur on simultaneous bi-directional links.

Figure 1:
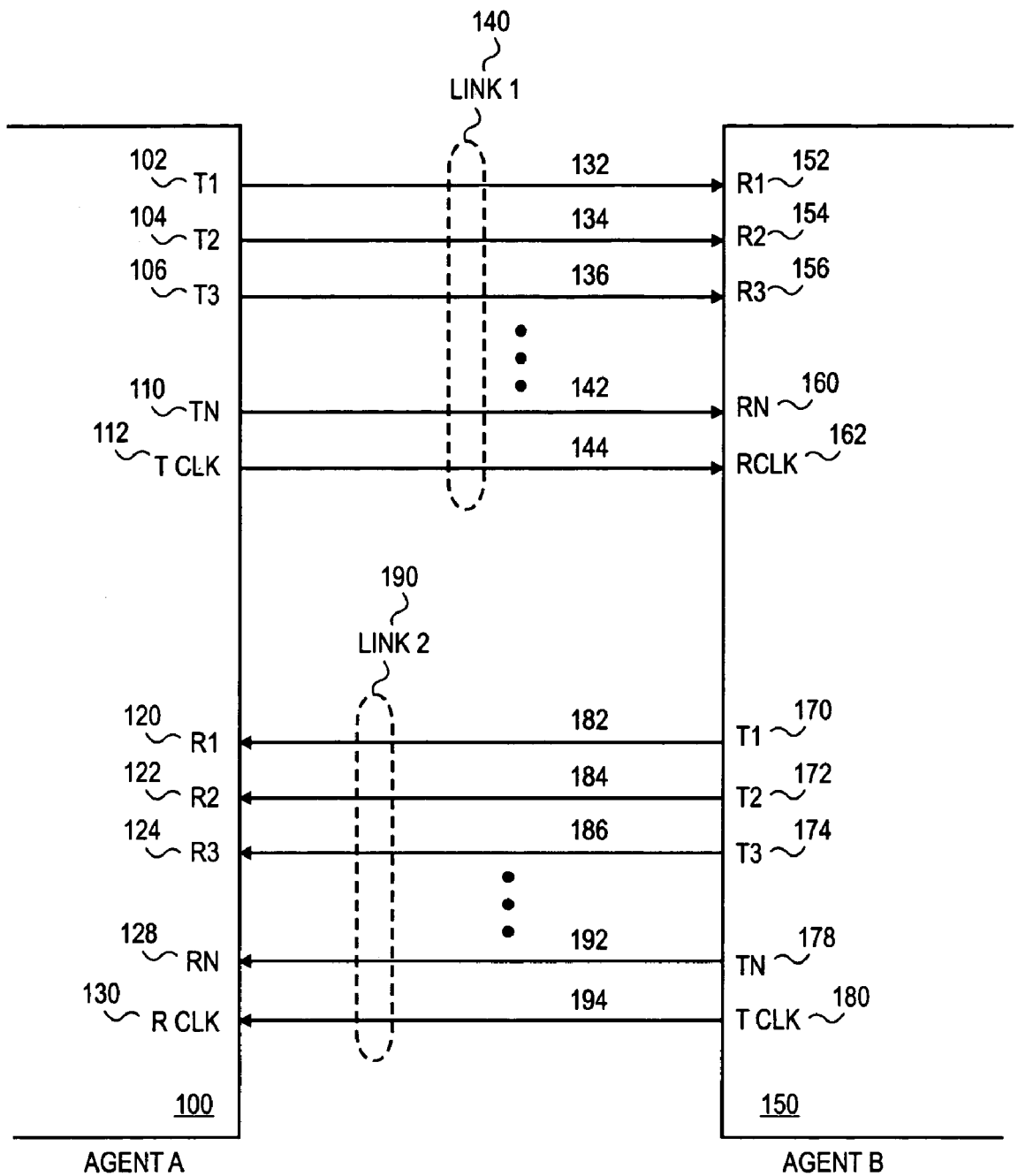
FIG. 1 is a schematic diagram of a pair of agents connected via an interface including a pair of point-to-point links, according to one embodiment of the present disclosure.

Referring now to FIG. 1, a schematic diagram of a pair of agents connected via an interface including a pair of point-to-point links is shown, according to one embodiment of the present disclosure. For the purpose of the present disclosure, an "agent" may be a processor, digital signal processor, memory controller, input/output controller, or any other functional circuit that connects to another functional circuit via the interface under consideration. Agent A 100 may be connected to a link 1 140 for transmitting data to agent B 150 and a second link 2 190 for receiving data sent by agent B 150. Link 1 140 and link 2 190 may be said to form an interface between agent A 100 and agent B 150.

Agent A 100 may have series of lane transmitters T1 102 through TN 110 and a clock transmitter TCLK 112 for sending data across link 1 140. In other embodiments, the external clock transmitter may be omitted and the lane transmitters may send self-clocked data, or data clocked by a common clock. Agent B 150 may have a series of lane receivers R1 152 through RN 160 and a clock receiver RCLK 162 to receive the data and clock sent by agent A 100. Similarly, Agent B 150 may have series of lane transmitters T1 170 through TN 178 and a clock transmitter TCLK 180 for sending data across link 2 190. In other embodiments, the external clock transmitter may be omitted and the lane transmitters may send self-clocked data, or data from a common clock source external to either agent. Agent A 100 may have a series of lane receivers R1 120 through RN 128 and a clock receiver RCLK 130 to receive the data and clock sent by agent B 150.

The link 1 140 and link 2 190 are shown as including interconnecting lanes for physical transport between agents A 100 and B 150. The lanes in various embodiments may be unbalanced or balanced, differentially-driven. The number of lanes N may be any number. In some embodiments, when soft errors or hard errors in one or more lane are detected, those lanes may be ignored and the link may be configured for operation as a parallel interface with fewer than N lanes.

At high transmission rates, the impedances or electrical lengths of lanes 132, 134, 136, up to 142 may have significant differences (here electrical lengths may be related to the physical lengths taking into account the effects of frequency). This may cause unacceptable skews between lanes. For this reason, an initialization process may be undertaken upon power-on or other system reset activity. The initialization process may train the individual receivers R1 152 through RN 160 to compensate for skew and other anomalies to permit efficient operation of link 1 140 as a parallel data interface. Similarly the initialization process may train the individual receivers R1 120 through RN 128 to compensate for skew and other anomalies to permit efficient operation of link 2 190 as a parallel data interface. After this initialization process, periodic retraining may be necessary to continue compensating for skew.

In one embodiment, a sequence of numbered messages, called "training sequences", may be sent over the individual lanes (132 through 142) temporarily acting during the initialization process as N individual serial interfaces clocked by TCLK 112 (where TCLK 112 is transmitted over signal path 144). The use of the lanes as individual serial interfaces avoids the skew and other anomalies initially present when using link 1 140 and link 2 190 as parallel interfaces. There may be a first type of training sequence, a second type of training sequence, up to a final type of training sequence. Each of these numbered training sequences may pass parameter data for efficiently setting up the link 1 140. An equivalent series of training sequences may be sent on link 2 190. The outcome of the passing of training sequences back and forth across link 1 140 and link 2 190 may be to configure operational parallel interfaces using the lanes of link 1 140 and link 2 190. For example, the first training sequence may exhibit a known data pattern from which intra-lane skew timing may be determined. A second training sequence may pass parametric data about this timing and also about soft and hard data errors detected in the lanes.

Figure 2:
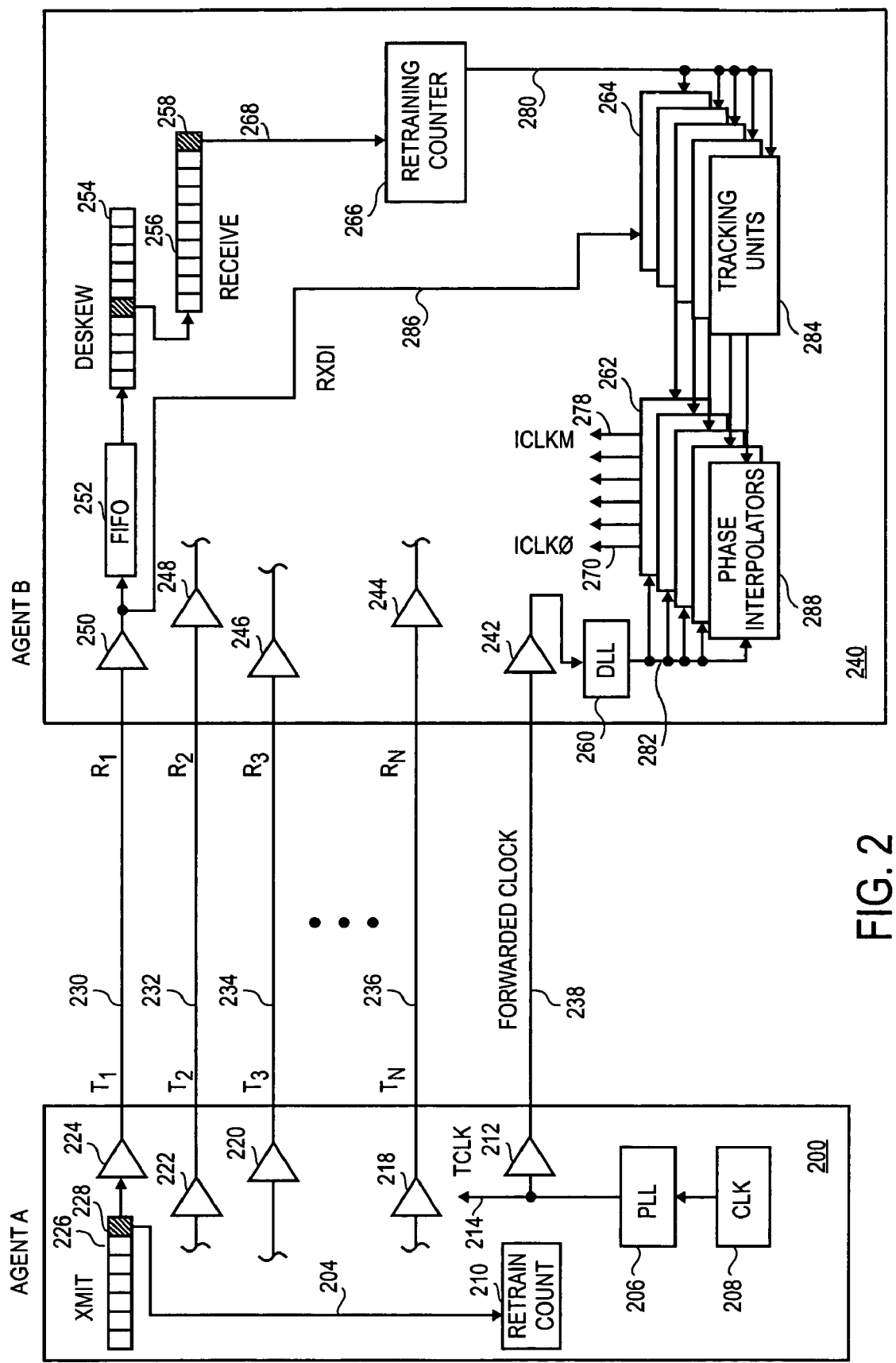
FIG. 2 is a circuit diagram showing interface circuitry, including retraining logic, according to one embodiment of the present disclosure.

Referring now to FIG. 2, a circuit diagram of interface circuitry, including retraining logic, is shown, according to one embodiment of the present disclosure. The link shown in FIG. 2 may be generally similar to the link 1 140 or link 2 190 of FIG. 1. The link in only one direction is shown for clarity. Only four data links 230, 232, 234, and 236 are shown for clarity, but in various embodiments many more data links may be used, for example 16, 32, or 64.

The output of a clock generator 208 may be stabilized and multiplied by a phase-lock loop (PLL) 206 before being used as a transmit clock (TCLK) 214 within agent A 200. A transmit buffer 226, which in one embodiment may be a multi-bit wide shift register, may be used to hold data in parallel format for transmission. TCLK 214 may be used to clock out the transmit data in parallel from transmit buffer 226 over transmitters 224, 222, 220, 218 onto data links 230, 232, 234, 236. (A representative connection from transmit buffer 226 to transmitter 224 is shown.) TCLK 214 may also be sent via a clock transmitter 212 as forwarded clock 238 to agent B 240, where it may be received by clock receiver 242 and stabilized by delay locked loop (DLL) 260 to form receive clock (RCLK) 282. In other embodiments, DLL 260 may be a PLL.

Agent A 200 may also include a retraining counter 210. Retraining counter 210 may be incremented by a clock in order to monitor an elapsed time interval from a resetting event. A threshold count value $C_0$ may be determined that may correspond to the retraining interval $T_0$ between successive retraining events. The retraining interval $T_0$ may be determined from circuit simulation or from testing. In one embodiment, the retraining interval $T_0$ may be programmed by firmware, such as a basic input/output system (BIOS). The retraining interval $T_0$ may be used to determine when to begin retraining of the receiving circuit elements in order to maintain compensation for skew. In one embodiment, the retraining interval $T_0$ for the interface shown in FIG. 2 may be between 1 and 10 milliseconds. In some embodiments, the retraining counter may also track the retraining duration $T_1$ of the retraining event. In one embodiment, a second count $C_1$ may be used to determine when the corresponding retraining duration $T_1$ is reached. In one embodiment, the retraining duration $T_1$ may again be programmed by firmware, such as a BIOS.

When the retraining counter 210 reaches count value $C_0$, corresponding to the retraining interval $T_0$, a retraining operation may be scheduled. At the end of the pending transmission of a flow-control mechanism quanta of data transmission, called a flow-control digit (flit), further flits forwarded from the flow-control mechanism may be inhibited from transmission during the retraining operation. (In one embodiment, the flow-control mechanism may include a link-layer protocol.) A special retraining physical digit (phit) may be then inserted into the transmit buffer 226. In one embodiment, the phit may be one parallel word sent across the interface, whereas the flit may include many phits. In one embodiment, the retraining phit may consist primarily of alternating ones and zeros to enhance the number of logic level transitions. In other embodiments, the retraining phits may be of any form. After the special retraining phit(s) have been transmitted, the pending flits forwarded from the flow-control mechanism may be enabled to be subsequently transmitted. The number of retraining phits transmitted may not align upon the boundaries of the flits.

Agent B 240 may receive the data from agent A 200 on a series of receivers 244, 246, 248, 250. In one embodiment, agent B 240 has two sets of circuits to compensate for skew. Only the circuits for the first data lane are shown for clarity, which act upon data received on receiver 250. For skew of granularity less than one clock sampling interval, a first-in-first-out (FIFO) buffer 252 may be used. For skew of granularity greater than one clock sampling interval, a deskewing buffer 254 may be used. Deskewing buffer 254 may take data received from FIFO buffer 252 and shift it one position each subsequent clock cycle. The data may be read out of deskewing buffer 254 from one of the series of outputs, thus delaying the data by a fixed multiple of the clock sampling interval. Similar deskewing buffers (not shown) may be attached to each of the other receivers 248, 246, 244, permitting differing amounts of skew compensation. The outputs of all the deskewing buffers may then be input to receive buffer 256, which in one embodiment may be a multi-bit wide shift register, and that may be used to hold data in parallel form upon receipt.

In order to compensate for skew of granularity less than one clock sampling interval, the clocks supplied to each of FIFO buffers, such as FIFO buffer 252, may be individually adjusted. In one embodiment, the RCLK 282 may serve as input to each of a set 288 of phase interpolators. Each phase interpolator may output various interpolated clocks, each offset in phase a number of degrees from RCLK 282. These interpolated clocks may then be supplied to the FIFO buffers in order to accurately retrieve the corresponding link data bits. For example, phase interpolator 262, associated with FIFO buffer 252, may supply interpolated clocks ICLK0 270 through ICLKM 278 to FIFO buffer 252. One of the interpolated clocks ICLK0 270 through ICKLM 278 may be selected for clocking in the data to FIFO buffer 252. In one embodiment, a set 284 of tracking units may examine the fit between the various interpolated clocks and the received data bits sent on a received data (RXD) line, and map the interpolated clocks to the various FIFO buffers to enhance data reliability. For example, tracking unit 264, associated with FIFO buffer 252, may receive data from receiver 250 on signal RXD1 286. Tracking unit 264 may then work with phase interpolator 262 to supply the appropriate interpolated clock to FIFO butter 252.

In one embodiment, the set 284 of tracking units may include a significant amount of analog circuitry that consumes a non-trivial amount of power. Therefore, in one embodiment the set 284 of tracking units may be powered-down after the initial configuration of the data link, and powered-up when needed for retraining operations. Agent B 240 may include a retraining counter 266. Retraining counter 266 may be incremented by a clock in order to monitor an elapsed time interval from a resetting event. The threshold count value $C_0$ corresponding to the retraining interval $T_0$, used in the retraining counter 210 of agent A 200, may be used here in order to help synchronize the retraining operations. When retraining counter 266 reaches threshold count value $C_0$, it may send a wake-up signal 280 to the set 284 of tracking units in order to power-up the set 284 of tracking units.

When the tracking unit 264 is powered-up during a retraining operation, the tracking unit 264 may again examine the fit between the various interpolated clocks from phase interpolator 262 and the received data bits, and remap (if necessary) the interpolated clocks to FIFO buffer 252.

To initially synchronize the two retraining counters 210, 266, one embodiment may insert a special header containing a "signature" into initial training sequence messages sent during the initial power-on initialization or after a system reset. In one embodiment, when the signature reaches the head 228 of the transmit buffer 226, a signal 204 may reset the retraining counter 210. Upon receipt of this same message, when the signature reaches the equivalent head 258 of receive buffer 256, a signal 268 may reset the retraining counter. In this manner the two retraining counters may be synchronized with only the time-of-flight difference. As retraining phits will be received with the time-of-flight difference, this is acceptable. The retraining counters 210, 266 may thereafter remain in synchronization during multiple retraining events.

During the retraining operation, agent B 240 may prevent the transfer of any contents of receive buffer 256 to the flow-control mechanism. As the flow-control mechanism will therefore not see any of the retraining phits, this may prevent the flow-control mechanism from treating the retraining phits as erroneous or corrupted data. Once all of the retraining phits have been received, and the first subsequent data flit is then received, the transfer of contents of receive buffer 256 to the flow-control mechanism may be resumed.

Figure 3:
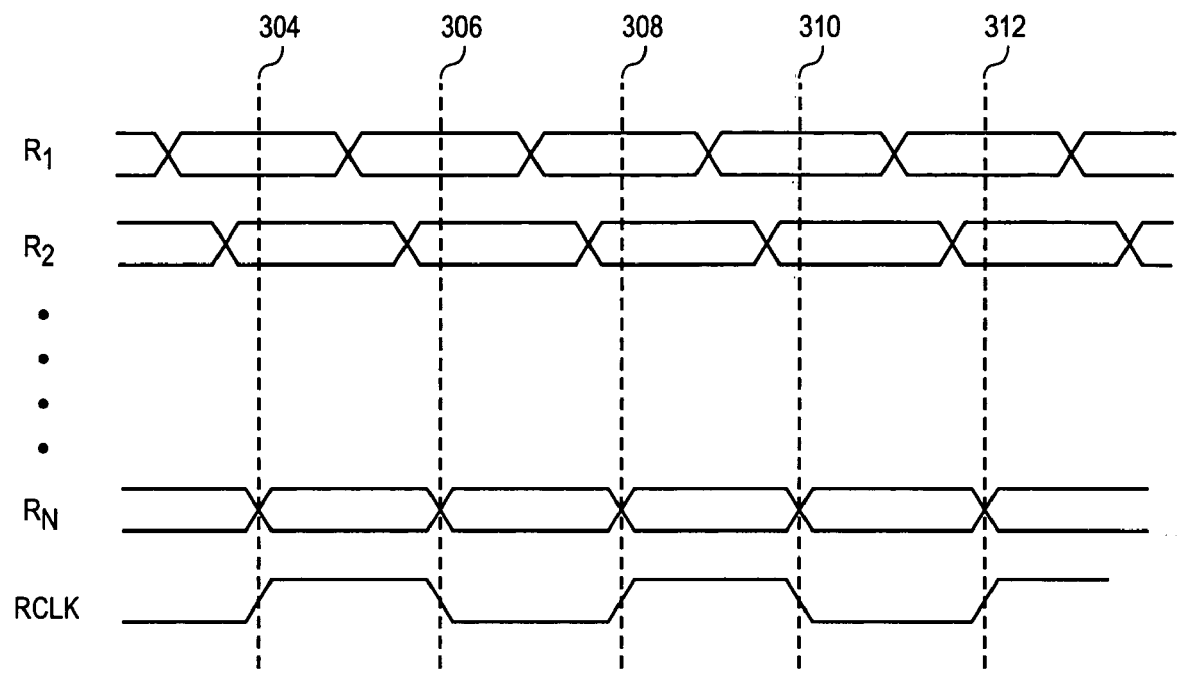
FIG. 3 is a timing diagram showing clock skew, according to one embodiment of the present disclosure.

Referring now to FIG. 3, a timing diagram of clock skew is shown, according to one embodiment of the present disclosure. In one embodiment, RCLK may cause data sampling on both rising and falling edges (double-data-rate clocking). Therefore FIG. 3 shows clock transitions 304, 306, 308, 310, and 312 for sampling data. In the case of data present at receiver R1, the clock transitions occur midway between the data transitions, so an interpolated clock with no phase shift could be used to clock the data. In the case of data present at receiver R2, the clock transitions occur significantly early, so an interpolated clock with some phase shift could be used to clock the data. Finally, in the case of data present at receiver RN, the clock transitions occur at the same time as the data transitions, so an interpolated clock delayed 90 degrees in phase could be used to clock the data.

Figure 4:
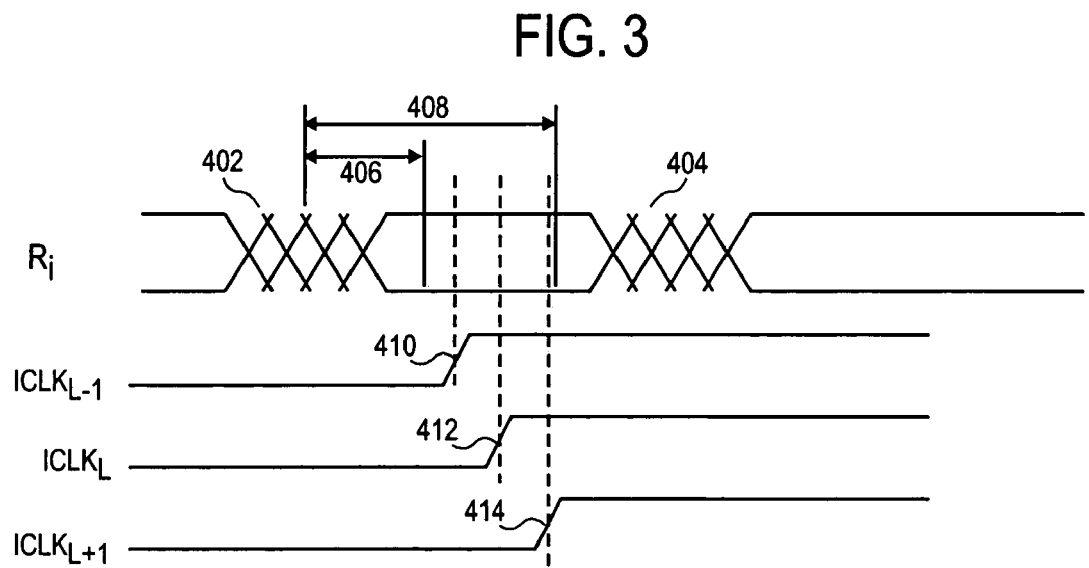
FIG. 4 is a timing diagram showing determining fit of interpolated clocks to data, according to one embodiment of the present disclosure.

Referring now to FIG. 4, a timing diagram of determining fit of interpolated clocks to data is shown, according to one embodiment of the present disclosure. The data at receiver Ri during the receipt of the retraining phits will include many transitions. Due to reasons including jitter, the transitions may occur over finite time periods 402, 404. In one embodiment, the tracking unit may determine from these time periods 402, 404 an average setup time 406 and an average hold time 408. The tracking unit may then examine the various interpolated clocks $ICLK_{L-1}$, $ICLK_L$, $ICLK_{L+1}$ for suitability as a data recovery clock. In one embodiment, the interpolated clock closest to the midpoint between the average setup time 406 and average hold time 408 may be selected. In one embodiment, the tracking unit may adjust the interpolated clock so that a version phased at 90 degrees is at the center of the window.

Figure 5:
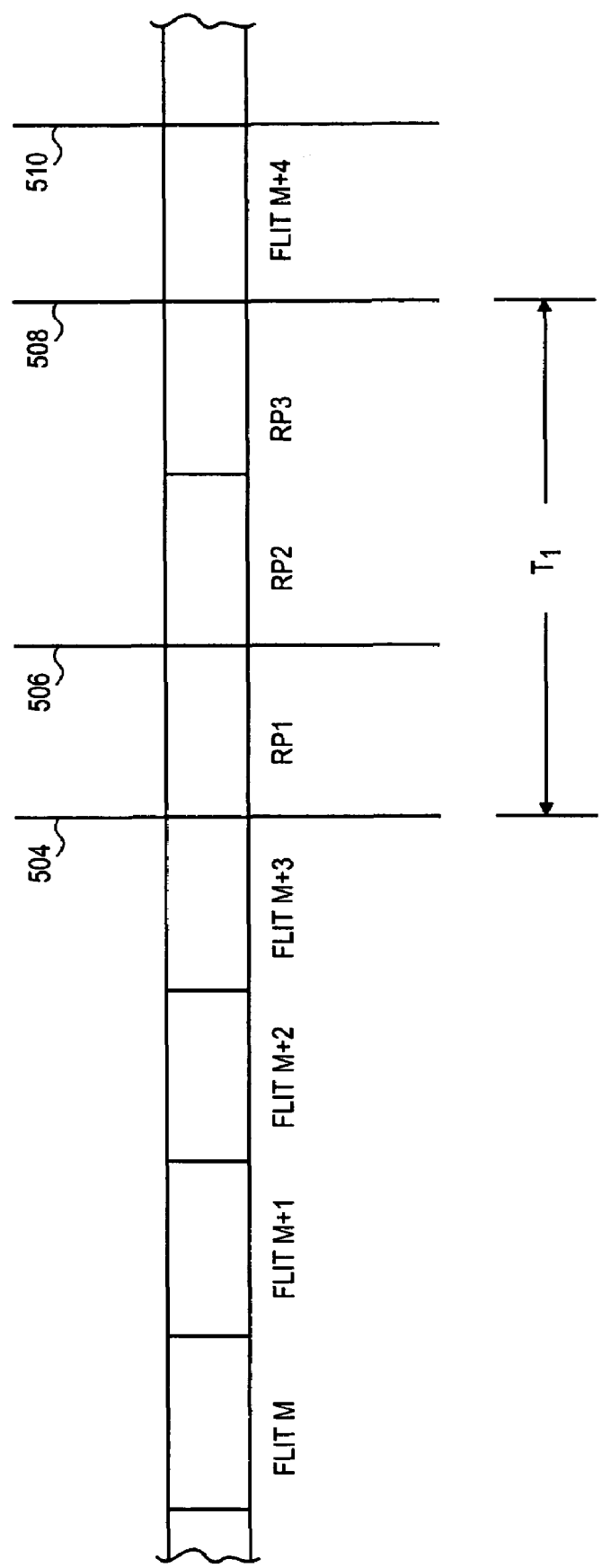
FIG. 5 is a timing diagram showing exclusion of retraining phits from flow-control mechanism flits, according to one embodiment of the present disclosure.

Referring now to FIG. 5, a timing diagram of exclusion of retraining phits from flow-control mechanism flits is shown, according to one embodiment of the present disclosure. The data sent by the flow-control mechanism may be called flow-control digits (flits), which in one embodiment may each include 80 bits total. Here the flits are being transmitted from one agent to another, and their data integrity is ensured by the flow-control mechanism. The flits may be sent at a particular time at the transmitting agent, and received a short while later at that time plus a time of flight (interface delay time).

If the retraining phits were received by the flow-control mechanism, they may appear to be spurious or erroneous data, thereby causing the flow-control mechanism to enter into data recovery efforts, including retransmission of flits. In order to prevent this, in one embodiment the flits queued for transmission may be buffered during the period of transmitting the retraining phits (the retraining duration $T_1$), and retraining phits received at the far end may be prevented from being delivered to the flow-control mechanism. In another embodiment, the flow-control mechanism may be directed to not send flits during the retraining period.

FIG. 5 shows one example, where flits are being sent across an interface. During the time of transmitting FLIT M+3, the retraining counter in the transmitting agent may reach the threshold count $C_0$ corresponding to the retraining interval $T_0$. At time 504, the transmitter may disable receiving the subsequent flits from the flow-control mechanism, and the physical-layer protocol of the transmitter may insert one or more retraining phits into the transmit buffer during the retraining duration $T_1$. When the receiving agent receives retraining phit RP1, at time 506 (plus a time of flight), this should correspond to the retraining counter in the receiving agent reaching the threshold count $C_0$ corresponding to the retraining interval $T_0$. Reaching this the threshold count $C_0$, the receiving agent may then disable the sending of RP1 data on to the flow-control mechanism.

Several retraining phits RP1, RP2, RP3 are sent, and RP3 may finish being received at time 508 (plus a time of flight). Because the transmitting agent knows how many retraining phits it is sending, it will be able to re-enable the loading and transmitting of flits without delay at time 508. FLIT M+4 may then be received at time 510 (plus a time of flight). Because time 510 (plus a time-of-flight) occurs the retraining duration $T_1$ after time 504, when the receiving agents retraining counter reset, the receiving agent may then forward without delay the data of FLIT M+4 on to the flow-control mechanism.

Figure 6:
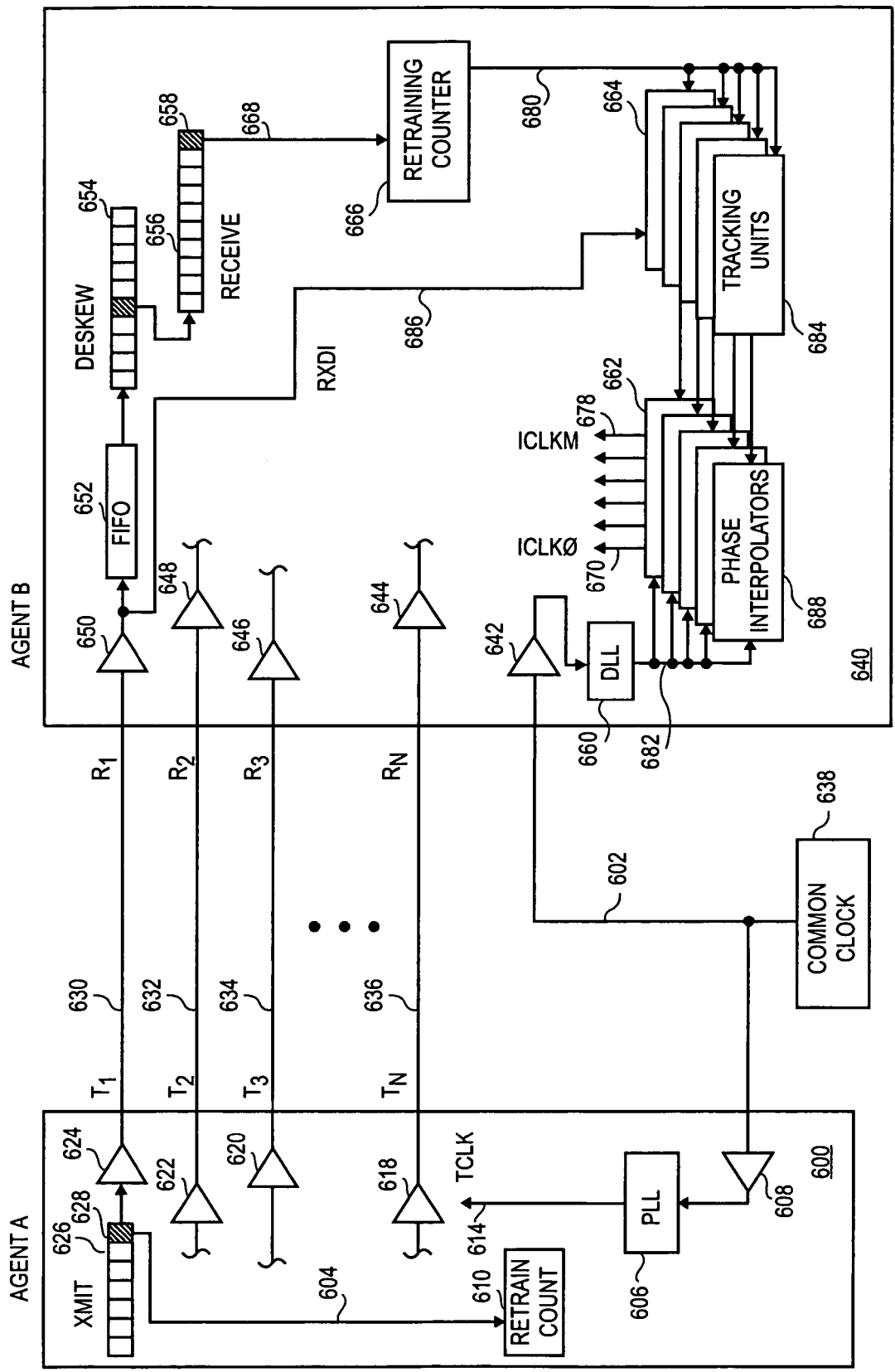
FIG. 6 is a circuit diagram showing interface circuitry, including retraining logic, according to another embodiment of the present disclosure.

Referring now to FIG. 6, a circuit diagram of interface circuitry, including retraining logic, is shown, according to another embodiment of the present disclosure. FIG. 6 shows generally a similar interface to that presented in FIG. 2 above, with the notable exception of the source of the clock, common clock 638, being external to both agent A 600 and agent B 640. In this case, TCLK 614 may be received by clock receiver 608, and stabilized and multiplied in PLL 606: RCLK 682 may be received by clock receiver 642, and stabilized and multiplied in PLL 660. The agents of FIG. 6 may engage in retraining operations in a similar fashion as performed in the FIG. 2 example, where similarly named circuits may perform similar functions. However, the distribution of the common clock 638 may not permit the retraining operations to be as infrequent as they were in the FIG. 2 example. Instead of a retraining interval $T_0$ of from 1 to 10 milliseconds, the retraining interval $T_0$ here may be substantially shorter than 1 millisecond. For this reason the forwarded clock shown in FIG. 2 may permit more efficient use of powering down the tracking unit to conserve power.

Figure 7:
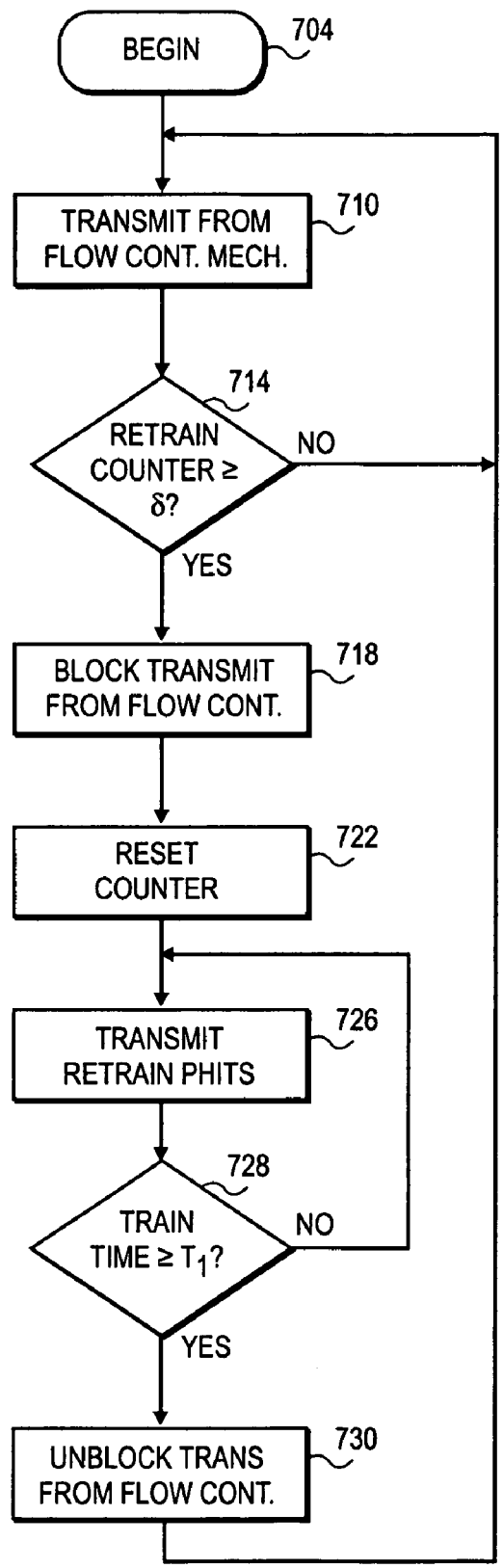
FIG. 7 is a flowchart showing transmission of retraining phits, according to one embodiment of the present disclosure.

Referring now to FIG. 7, a flowchart of transmission of retraining phits is shown, according to one embodiment of the present disclosure. In block 710, the transmitting agent may send a flit from the flow-control mechanism. Then in decision block 714, it may be determined whether the count in the retraining counter of the transmitting agent equals or exceeds the threshold value $C_0$ corresponding to the retraining interval $T_0$. If not, then the process leaves decision block 714 via the NO path and returns to block 710, where a subsequent flit may be transmitted.

If, however, the count does equal or exceed the threshold value $C_0$, then the process leaves decision block 714 via the YES path. In block 718, the transmitting agent blocks the transmission of further flits from the flow-control mechanism. Then in block 722, the retraining counter may be reset. In block 726, a retraining phit may be transmitted. In decision block 728, it may be determined whether the time spent in the retraining event exceeds the training duration $T_1$. If not, then the process exits via the NO path and in block 726 another retraining phit may be transmitted. However, when the time spent in the retraining event does exceed the training duration $T_1$, then the process exits via the YES path. Then in block 730 the transmission of further flits from the flow-control mechanism is unblocked, and the process returns to block 710. In other embodiments, the counters used in decision block 714 may count down instead of counting up.

Figure 8:
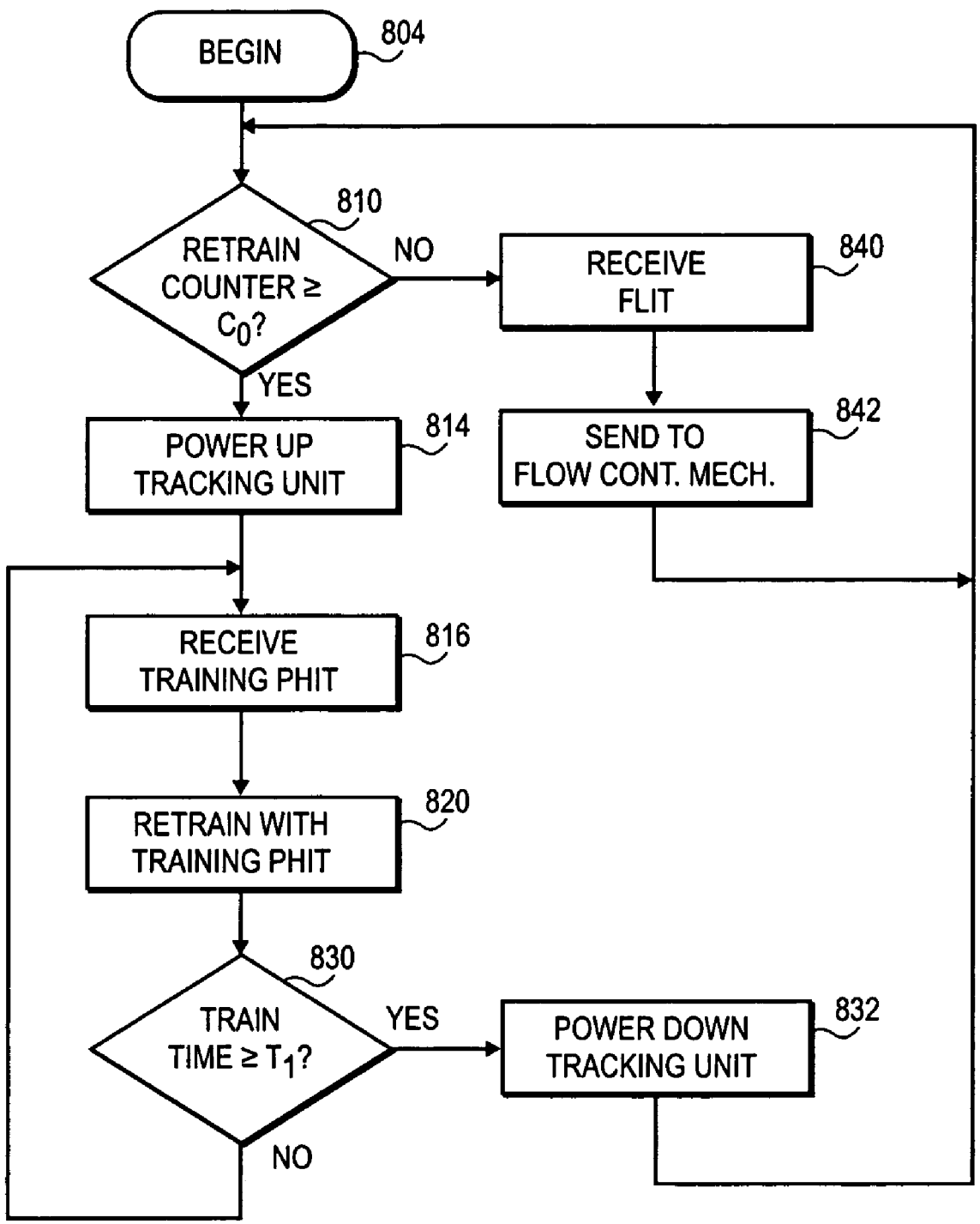
FIG. 8 is a flowchart showing receiving of retraining phits and powering-on of a tracking unit, according to one embodiment of the present disclosure.

Referring now to FIG. 8, a flowchart of receiving of retraining phits and powering-on of a tracking unit is shown, according to one embodiment of the present disclosure. In decision block 810, it may be determined whether the count in the retraining counter in the receiving agent equals or exceeds the threshold value $C_0$ corresponding to the retraining interval $T_0$. If not, then the process exits along the NO path and in block 840 the next flit is received into the receive buffer. That flit may be then sent to the flow-control mechanism in block 842, and then the process repeats to decision block 810.

If, however, the count in the retraining counter in the receiving agent does equal or exceed the threshold value $C_0$ corresponding to the retraining interval $T_0$, then the process exits along the YES path. In block 814 the tracking unit may be powered-up and the retraining counter in the receiving agent may be reset. Then in block 816 the next phit is received which may be a retraining phit. In block 820 the tracking unit may begin the retraining process using the just-received phit.

In decision block 830, it may be determined whether the retraining duration $T_1$ has been reached. If not, then the process exits along the NO path, and in block 816 another retraining phit is received. However, if the retraining duration $T_1$ has been reached, then the process exits along the YES path, and in block 832 the tracking unit is powered down. The process then returns to decision block 810. In other embodiments, the counters used in decision block 714 may count down instead of counting up.

Figure 9:
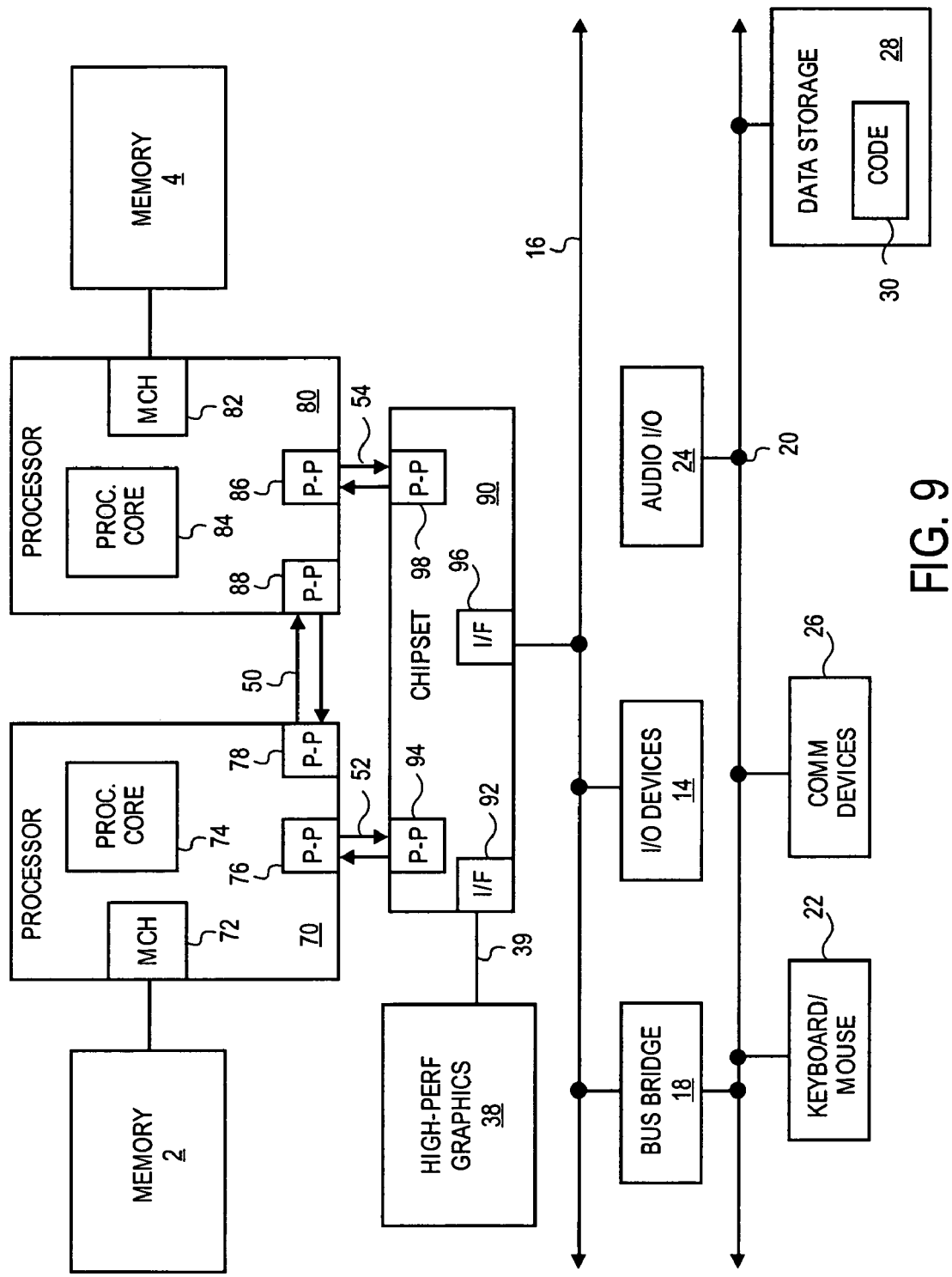
FIG. 9 is a schematic diagram of system including processors supporting an interface including a pair of point-to-point links, according to one embodiment of the present disclosure.

Referring now to FIG. 9, a schematic diagram of a system including processors supporting an interface including a pair of point-to-point links is shown, according to one embodiment of the present disclosure. The FIG. 9 system generally shows a system where processors, memory, and input/output devices are interconnected by a number of point-to-point interfaces.

The FIG. 9 system may include several processors, of which only two, processors 70, 80 are shown for clarity. Processors 70, 80 may each include a local memory controller hub (MCH) 72, 82 to connect with memory 2, 4. Processors 70, 80 may exchange data via a point-to-point interface 50 using point-to-point interface circuits 78, 88. Processors 70, 80 may each exchange data with a chipset 90 via individual point-to-point interfaces 52, 54 using point to point interface circuits 76, 94, 86, 98. In one embodiment, point-to-point interfaces 50, 52, 54 may be interfaces as described in FIGS. 1 through 8 of the present disclosure. Chipset 90 may also exchange data with a high-performance graphics circuit 38 via a high-performance graphics interface 92.

In the FIG. 9 system, chipset 90 may exchange data with a bus 16 via a bus interface 96. In the system, there may be various input/output I/O devices 14 on the bus 16, including in some embodiments low performance graphics controllers, video controllers, and networking controllers. Another bus bridge 18 may in some embodiments be used to permit data exchanges between bus 16 and bus 20. Bus 20 may in some embodiments be a small computer system interface (SCSI) bus, an integrated drive electronics (IDE) bus, or a universal serial bus (USB) bus. Additional I/O devices may be connected with bus 20. These may include keyboard and cursor control devices 22, including mice, audio I/O 24, communications devices 26, including modems and network interfaces, and data storage devices 28. Software code 30 may be stored on data storage device 28. In some embodiments, data storage device 28 may be a fixed magnetic disk, a floppy disk drive, an optical disk drive, a magneto-optical disk drive, a magnetic tape, or non-volatile memory including flash memory.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. An agent, comprising:
   a receive buffer to receive a retraining phit;
   a phase interpolator to select a clock to receive said retraining phit into said receive buffer; and
   a tracking unit to tune said phase interpolator and to be powered-down during an interval when said receive buffer is not receiving said retraining phit.

2. The agent of claim 1, wherein said tracking unit to be powered-up when a counter reaches a threshold corresponding to a retraining interval.

3. The agent of claim 2, wherein said retraining interval is determined by circuit simulation.

4. The agent of claim 2, wherein said retraining interval is stored in said agent.

5. The agent of claim 2, wherein said counter to be reset when an initial training sequence includes a signature.

6. The agent of claim 1, further comprising a logic to disable forwarding said retraining phit to a flow-control mechanism.

7. An agent, comprising:
   a counter to count a time period;
   a transmit buffer; and
   a logic to place a retraining phit into said transmit buffer when said counter reaches a threshold corresponding to a retraining interval.

8. The agent of claim 7, wherein said logic to disable receiving flits from a flow-control mechanism when said retraining phit is in said transmit buffer.

9. The agent of claim 8, wherein said counter to be reset when an initial training sequence in said transmit buffer includes a signature.

10. The agent of claim 7, wherein said logic to receive and store said retraining phit.

11. A system, comprising:
    a first agent including a first counter to count a time period, a transmit buffer, and a first logic to place a retraining phit into said transmit buffer when said first counter reaches a threshold corresponding to a retraining interval; and
    a second agent including a receive buffer to receive said retraining phit, a phase interpolator to select a clock to receive said retraining phit into said receive buffer, and a tracking unit to tune said phase interpolator and to be powered-down when said receive buffer is not receiving said retraining phit.

12. The system of claim 11, wherein said tracking unit to be powered-up when a second counter of said second agent reaches a threshold corresponding to said retraining interval.

13. The system of claim 12, wherein said second counter to be reset when an initial training sequence includes a signature.

14. The system of claim 11, wherein said second agent includes a second logic to disable forwarding said retraining phit to a flow-control mechanism.

15. The system of claim 11, wherein said first logic to disable receiving flits from a flow-control mechanism when said retraining phit is in said transmit buffer.

16. The system of claim 11, wherein said first counter to be reset when an initial training sequence in said transmit buffer includes a signature.

17. The system of claim 11, further comprising an audio input-output device.

18. A method, comprising:
    incrementing a first counter and a second counter to determine an interval;
    transmitting a retraining phit on said interface when said first counter reaches a threshold corresponding to a retraining interval;
    powering-up a tracking unit when said second counter reaches said threshold; and
    selecting a receiving clock using said tracking unit with said retraining phit.

19. The method of claim 18, further comprising resetting said first counter with a signature in an initial training sequence.

20. The method of claim 18, further comprising inhibiting flow-control mechanism flits from transmission when said retraining phit is present.

21. The method of claim 18, further comprising resetting said second counter when a signature in an initial training sequence is received.

22. The method of claim 18, further comprising inhibiting said retraining phit from being sent on to a flow-control mechanism.

23. An apparatus, comprising:
    means for incrementing a first counter and a second counter to determine an interval;
    means for transmitting a retraining phit on said interface when said first counter reaches a threshold corresponding to a retraining interval;
    means for powering-up a tracking unit when said second counter reaches said threshold; and
    means for selecting a receiving clock using said tracking unit with said retraining phit.

24. The apparatus of claim 23, further comprising means for resetting said first counter.

25. The apparatus of claim 23, further comprising means for inhibiting flow-control mechanism flits from transmission when said retraining phit is present.

26. The apparatus of claim 23, further comprising means for resetting said second counter.

27. The apparatus of claim 23, further comprising means for inhibiting said retraining phit from being sent on to a flow-control mechanism.

* * * * *